United States Patent
Pappas

(10) Patent No.: US 10,943,304 B2
(45) Date of Patent: Mar. 9, 2021

(54) PROVIDING RESTITUTION WHEN AN UNATTENDED PACKAGE IS STOLEN BY A PORCH-BANDIT THIEF

(71) Applicant: Cary C Pappas, Collierville, TN (US)

(72) Inventor: Cary C Pappas, Collierville, TN (US)

( * ) Notice: Subject to any disclaimer, the term of this patent is extended or adjusted under 35 U.S.C. 154(b) by 52 days.

(21) Appl. No.: 16/372,409

(22) Filed: Apr. 2, 2019

(65) Prior Publication Data
US 2020/0320635 A1  Oct. 8, 2020

(51) Int. Cl.
| | | |
|---|---|---|
| *G06Q 40/00* | (2012.01) | |
| *G06Q 40/08* | (2012.01) | |
| *G06Q 10/08* | (2012.01) | |
| *G06Q 40/02* | (2012.01) | |

(52) U.S. Cl.
CPC .......... *G06Q 40/08* (2013.01); *G06Q 10/083* (2013.01); *G06Q 40/02* (2013.01)

(58) Field of Classification Search
CPC ....... G06Q 40/08; G06Q 10/083; G06Q 40/02
See application file for complete search history.

(56) References Cited

U.S. PATENT DOCUMENTS

| | | | | |
|---|---|---|---|---|
| 10,062,118 | B1* | 8/2018 | Bernstein | G06Q 40/08 |
| 2002/0188482 | A1* | 12/2002 | Friend | G06Q 40/02 705/4 |
| 2007/0011033 | A1* | 1/2007 | Atkinson | G06Q 10/10 705/4 |
| 2012/0116823 | A1* | 5/2012 | Vasavada | G06Q 10/10 705/4 |
| 2012/0284058 | A1* | 11/2012 | Varanasi | G06Q 40/08 705/4 |

(Continued)

FOREIGN PATENT DOCUMENTS

| | | | | |
|---|---|---|---|---|
| WO | WO-2015016982 A1 * | 2/2015 | ......... | G06Q 10/0833 |
| WO | WO-2020082583 A1 * | 4/2020 | | |

OTHER PUBLICATIONS

Stickle et al., "Porch Pirates: examining unattended package theft through crime script analysis," Criminal Justice Studies 2020, vol. 33, No. 2, 79-95, 2019. (Year: 2019).*
Rebecca Edwards, "A Guide to Recovering Your Lost or Stolen Packages," www.safewise.com/blog, 2019. (Year: 2019).*
USPS, "Claims for Loss or Damage," www.about.usps.com/publications, 2019. (Year: 2019).*

(Continued)

*Primary Examiner* — Alexander G Kalinowski
*Assistant Examiner* — William B. Bunker
(74) *Attorney, Agent, or Firm* — H. Brock Kolls

(57) ABSTRACT

The present invention relates to a system and method for providing restitution to a beneficiary when a package shipped by an originating shipper to a destination address, by way of a designated package transport carrier, is left unattended and stolen prior to the package recipient taking receipt of the package.

In an exemplary embodiment, a beneficiary is compensated, in accordance with a package repayment plan terms and conditions, when at least: a missing package report was created by the designated package transport carrier, the missing package report indicates the package was delivered to the destination address during the plan enforcement period, and the originating shipper and the designated package transport carrier declined to provide suitable remedy for the stolen package.

Other embodiments include authorizing coverage for an address and package value, charging a transaction fee for authorizing coverage, and identifying fraud.

20 Claims, 5 Drawing Sheets

(56) References Cited

U.S. PATENT DOCUMENTS

| | | | | |
|---|---|---|---|---|
| 2013/0304516 A1* | 11/2013 | Schimelman | .......... | G06Q 40/08 705/4 |
| 2014/0310026 A1* | 10/2014 | Balthazar | ............... | G06Q 40/08 705/4 |
| 2015/0039347 A1* | 2/2015 | Sharma | .............. | G06Q 10/0833 705/4 |
| 2015/0081343 A1* | 3/2015 | Streebin | ................ | G06Q 40/08 705/4 |

OTHER PUBLICATIONS

USPS, "500 Additional Services (Postal Explorer)," https://pe.usps.com/text, 2019. (Year: 2019).*

Anonymous, "What Online Retailers Can Do to Stop Porch Pirates," https://www.catman.global/online-retailers-can-stop-porch-pirates, 2019. (Year: 2019).*

* cited by examiner

PROVIDING RESTITUTION WHEN AN UNATTENDED PACKAGE IS STOLEN BY A PORCH-BANDIT THIEF

TECHNICAL FIELD OF THE INVENTION

This invention relates to a system and method for providing restitution to a beneficiary when a package shipped by an originating shipper to a destination address, by way of a designated package transport carrier, is left unattended and stolen prior to the package recipient taking receipt of the package.

BACKGROUND OF THE INVENTION

Before our invention, with the growth of e-commerce, more and more people are purchasing products online and having them shipped to their destination address of choice. Often these destination addresses are their home where at the time of delivery a recipient might not be present. As such, when a recipient is not home often the delivery company will just leave the package unattended outside the recipient's house.

In a sign of our times, such unattended packages are appealing to thieves. In fact, porch-pirating, as it is often called, is the practice of thieves who steal unattended packages. This problem has reached an epidemic level generating a multi-billion US dollar annual loss to businesses and consumers. In fact, 2017 package theft statistics suggested that 31% of us have experienced a package theft and that there are 17 reported incidents per 1,000 people in metro areas. In addition, the average stolen package value is now $140 and police make arrests in less than 10% of reported theft cases.

When the package is delivered and then pirated, the recipient may have little recourse. They can try to seek a replacement or refund, from the company they bought the product from or they can try to seek a remedy from the delivery company. However absent some kind of fault and if records indicate the package was delivered, the companies involved will often just deny the recipient's claim. Once the claim is denied it can be a total loss for the recipient, no product in hand and out the money spent on the product and shipping as well.

The present invention addresses this and other shortcomings by providing restitution to a beneficiary when a product is purchased, shipped, and delivered but before the recipient can secure the unattended package it is stolen by a rascal porch-bandit. For these reasons and shortcomings as well as other reasons and shortcomings there is a long felt need that gives rise to the present invention.

SUMMARY OF THE INVENTION

The shortcomings of the prior art are overcome and additional advantages are provided through the provision of a method for providing restitution to at least one of a beneficiary when a package shipped by an originating shipper to at least one of a destination address, by way of a designated package transport carrier, is left unattended and stolen from the destination address prior to the package recipient taking receipt of the package and the originating shipper and the designated package transport carrier declined making suitable remedy for the package that was stolen.

The method comprises the steps of enabling a plan manager to select a package repayment plan, the package repayment plan further comprising at least one of a beneficiary and at least one of a required payment term.

The method continues with the steps of associating at least one of the destination address with the package repayment plan and establishing a plan enforcement period commensurate with receipt of payment in accordance with the required payment term.

Additional steps include receiving a missing package report related to the package which was reportedly delivered, by the designated package transport carrier, then stolen during the plan enforcement period, and compensating the beneficiary in accordance with the package repayment plan when the missing package report was created by the designated package transport carrier, the missing package report indicates the package was delivered to the destination address during the plan enforcement period, and the originating shipper and the designated package transport carrier declined to provide a suitable remedy for the package that was stolen.

Additional shortcomings of the prior art are overcome and additional advantages are provided through the provision of a system for providing restitution to at least one of a beneficiary when a package shipped by an originating shipper to at least one of a destination address, by way of a designated package transport carrier, is left unattended and stolen from the destination address prior to the package recipient taking receipt of the package and the originating shipper and the designated package transport carrier declined making suitable remedy for the package that was stolen.

The system comprises a data processing resource, the data processing resource further comprising a microprocessor and a memory, the data processing resource is configured to data communicate with other data processing resources across a global network.

The memory is encoded with instructions that when executed perform the steps of enabling a plan manager to select a package repayment plan, the package repayment plan further comprising at least one of the beneficiary and at least one of a required payment term.

The steps continue by associating at least one of a destination address with the package repayment plan and establishing a plan enforcement period commensurate with receipt of payment in accordance with the required payment term.

Additional steps include receiving a missing package report related to the package which was reportedly delivered, by the designated package transport carrier, then stolen during the plan enforcement period and compensating the beneficiary in accordance with the package repayment plan when the missing package report was created by the designated package transport carrier, the missing package report indicates the package was delivered to the destination address during the plan enforcement period, and the originating shipper and the designated package transport carrier declined to provide a suitable remedy for the package that was stolen.

Additional shortcomings of the prior art are overcome and additional advantages are provided through the provision of a method for providing restitution to at least one of a beneficiary when a package shipped by an originating shipper to at least one of a destination address, by way of a designated package transport carrier, is left unattended and stolen from the destination address prior to the package recipient taking receipt of the package and the originating shipper and the designated package transport carrier declined making suitable remedy for the package that was stolen.

The method comprising the steps of enabling a plan manager to select a package repayment plan, the package repayment plan further comprising at least one of a beneficiary and at least one of a required payment term and authorizing coverage for a destination address and value of the package.

The steps continue by charging a transaction fee in connection with the step of authorizing to satisfy the required payment term, establishing a plan enforcement period commensurate with receipt of payment in accordance with the required payment term, and receiving a missing package report related to the package which was reportedly delivered, by the designated package transport carrier, then stolen during the plan enforcement period.

Additional steps include compensating the beneficiary in accordance with the package repayment plan when the missing package report was created by the designated package transport carrier, the missing package report indicates the package was delivered to the destination address during the plan enforcement period, and the originating shipper and the designated package transport carrier declined to provide suitable remedy for the package that was stolen.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE FIGURES

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Figure 1:
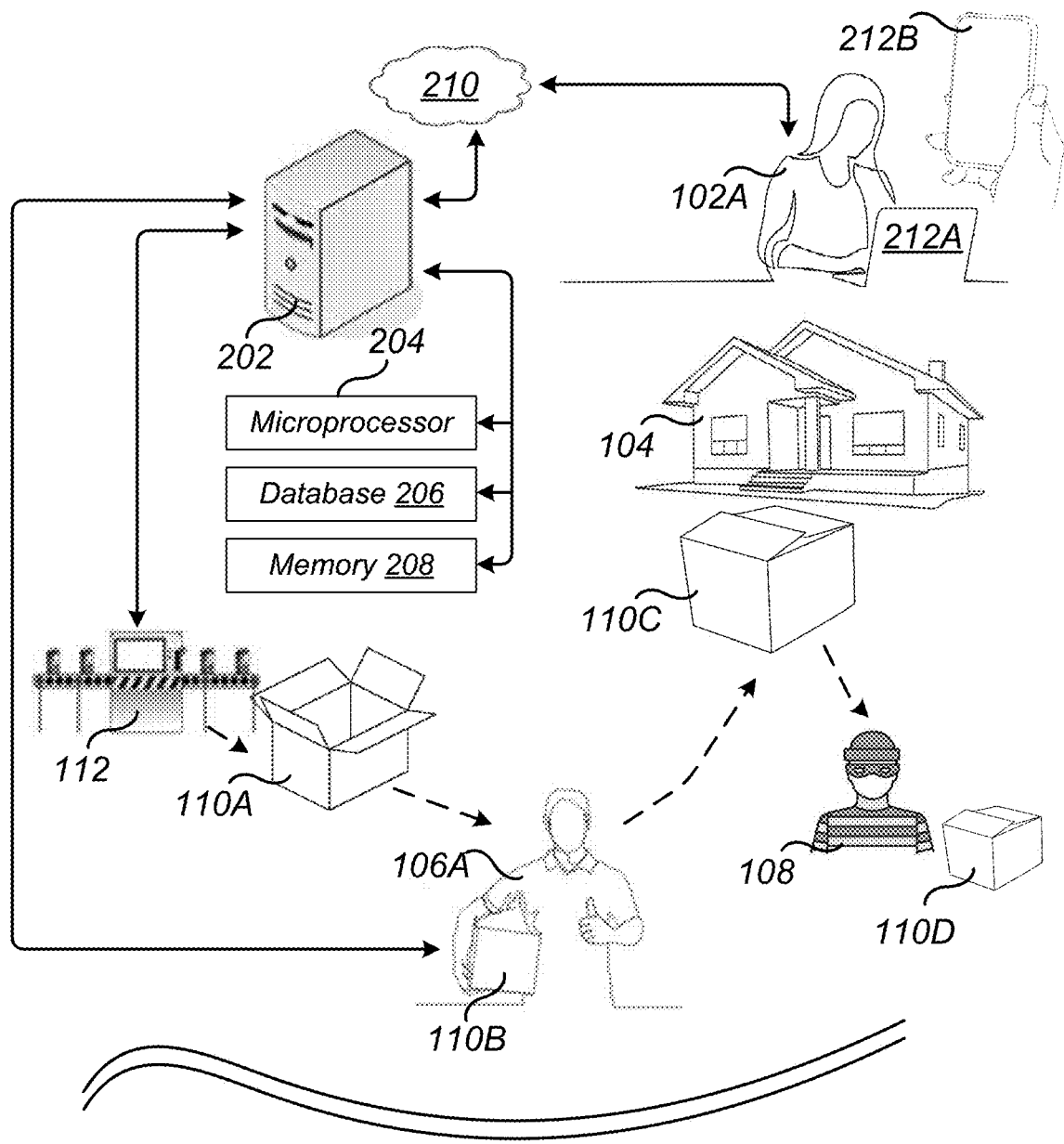
FIG. 1 illustrates one example of system for providing restitution to at least one of a beneficiary when a package shipped by an originating shipper to at least one of a destination address, by way of a designated package transport carrier, is left unattended and stolen prior to the package recipient taking receipt of the package.
Figure 1:
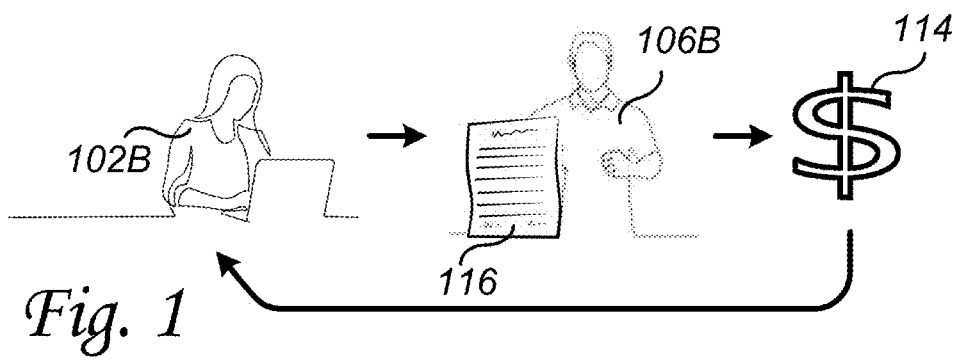

Turning now to the drawings in greater detail, it will be seen that in FIG. 1 there is illustrated one example of a system for providing restitution to at least one of a beneficiary when a package shipped by an originating shipper to at least one of a destination address, by way of a designated package transport carrier, is left unattended and stolen prior to the package recipient taking receipt of the package.

Use of the term "porch-bandit" in the present invention is intended to mean a criminal that steals unattended packages from a porch of a home, a building, a workplace, a warehouse, or steals packages from other types and/or kinds of dwellings.

In the present invention a financial institute can be an issuing credit card or other payment implement company, payment facilitators, a bank or similar, digital crypto-currency, on online payments institute such as PAYPAL or similar or other types and kinds of financial institutes, as may be required and/or desired in the particular embodiment. CHASE, JP MORGAN, WELLS FARGO, E-TRADE, BANK OF AMERICA, VENMO, BITCOIN, ETHEREUM, and PAYPAL are examples and not a limitation of financial institutes. For disclosure purposes, such financial institutes and others provide payment products to consumers and business to enable them to exchange money (as example credit cards, electronic checks, and online payment accounts), such in the present invention can be collectively referred to as payment implements.

An e-commerce company can sell products online as well as sell products in a physical location and package and ship products as necessary. Such an e-commerce company can be AMAZON, WALMART, MACY'S, KOHLS, APPLE, or other similar are examples and not a limitation of an e-commerce company as well as an originating shipper.

The designated package transport carrier is the company that transports and delivers packages. Such a designated package transport carrier can be FEDEX, United Parcel Service (UPS), DHL, AMAZON, or other similar are examples and not a limitation of a designated package transport carrier.

In an exemplary embodiment, whether in person or across a global network 210, a customer 102A, who may also be the plan manager and/or beneficiary, can order products by way of a digital device 212A or 212B, from an e-commerce company, manufacturer, factory, store, shipper, order fulfiller, shipping agents, marketplace, distributor, or other, collectively referred to as the originating shipper 112.

In this arrangement, the ordered products 110A are to be shipped by an originating shipper 112 to a destination address 104 by way of a designated package transport carrier 106A. In the event the designated package transport carrier arrives at the pre-determined destination address 104 with package 110B and nobody is available to receive the package, the designated package transport carrier 106A is inclined to leave the package 110C unattended at the pre-determined destination address 104. This leaves the package 110C vulnerable where a porch-bandit thief 108 can steal the package 110D before the recipient is able to take receipt and secure the package.

Digital devices 212A and 212B can be laptops, smart phone, tablets, and other types and kinds of digital devices. For example and not a limitation, such digital devices 212A and 212B can be APPLE, SAMSUNG, IPHONE, WAD, GALAXY, HTC, or other computer, tablet, and smart phone type products.

To provide restitution for packages stolen from destination addresses, a plan manager can select a package repayment plan. Such a package repayment plan would provide, while enforce, compensation in accordance with the package repayment plan to a beneficiary.

In the event a package 110C is stolen by a dastardly porch-bandit 108 the plan manager 102B can initially request that the designated package transport carrier 106B investigate. To this end, the designated package transport carrier 106B will create a missing package report 116. Should the conclusion of the missing package report 116 be that the designated package transport carrier 106B is denying a claim or otherwise declining to provide suitable remedy and the originating shipper 112 is also denying a claim then such missing package report 116 can be submitted in the present invention and in accordance with terms of a package repayment plan, that are enforce, compensation 114 will be paid to the designated beneficiary.

An advantage in the present invention is the use of a missing package report that was created by the designated package transport carrier. In this regard, these companies typically have excellent resources for investigating missing packages. Such reports can illuminate fraud as well as validate that the package was successfully delivered. In many cases, the investigation by the designated package transport carrier can resolve the matter and reliance on the disposition of such reports to form the basis of the package protection claim limits payments to beneficiaries, in the present invention, to cases when and where appropriate, without having to conduct time consuming and costly inquiries, as the designated package transport carrier have done this work already.

In an exemplary embodiment, the system and methods of the present invention can be computer-implemented. As example and not a limitation, a data processing resource 202 can be a server that communicates across a global network 210. The global network 210 can be the Internet. The data processing resource further comprises a microprocessor 204, a database 206, and a memory 208. The data processing resource 202, the microprocessor 204, the database 206, and the memory 208 are operationally related. Instructions can be encoded in the memory 208 so that when executed by the microprocessor 204 the method steps of the present invention are effectuated.

In addition, the originating shippers and/or the designated package transport carrier companies can data communicate with the data processing resource 202. In this regard, in exemplary embodiments, such interoperability allows destination addresses to be specified at the time of shipment. Furthermore, destination address can be changed while the package is in-route, such as when a pattern of fraud is identified, to prevent the fraud from occurring. Additionally, plan coverage can be authorized on a per-package basis for the destination address, value of the package, shipping date and method, and other considerations. To this end, such authorizing can generate a transaction fee which would suffice as one of the required payment term options, as well as provide cost flexibility to charge more for a higher porch-bandit risks associated with certain destination addresses and/or delivery circumstances. Such transaction fees can rely in part on the plurality of delivery risk metrics generated and other factors.

Figure 2:
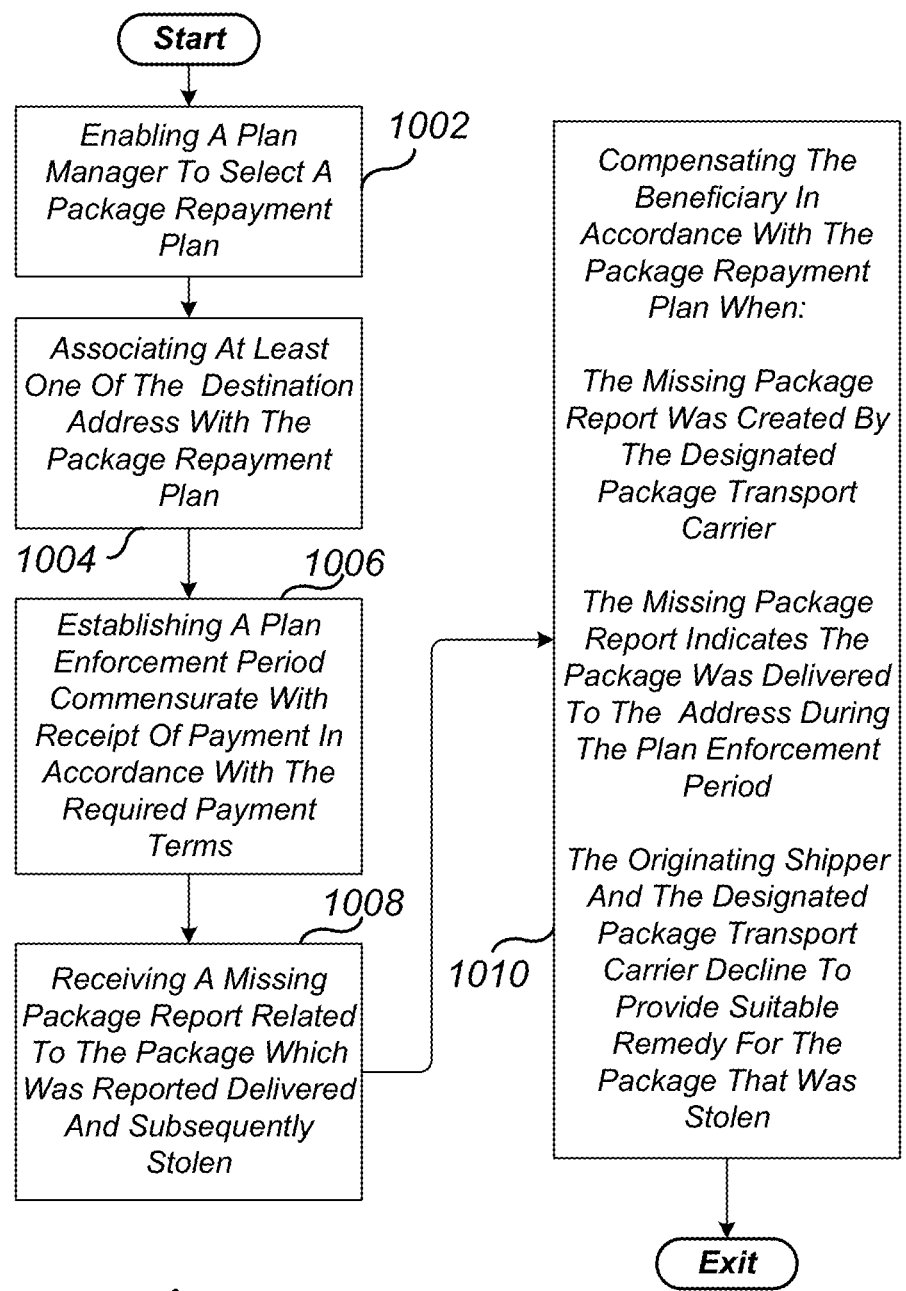
FIGS. 2 and 3 illustrate examples of a method for providing restitution to at least one of a beneficiary when a package shipped by an originating shipper to at least one of a destination address, by way of a designated package transport carrier, is left unattended and stolen prior to the package recipient taking receipt of the package.

Referring to FIG. 2 there is illustrated one example of a method for providing restitution to at least one of a beneficiary when a package shipped by an originating shipper to at least one of a destination address, by way of a designated package transport carrier, is left unattended and stolen prior to the package recipient taking receipt of the package. The method then begins in block 1002.

In block 1002, a plan manager is enabled to select a package repayment plan, the package repayment plan further comprising at least one beneficiary and at least one of a required payment term.

In an exemplary embodiment, a plan manager can select a package repayment plan. Such a plan manager could be a customer, package recipient, a financial institute, an insurance company, a consumer protection agency, the originating shipper, a manufacture, a distributor, a retail store, an e-commerce company, the designated package transport carrier, or other types and kinds of plan managers, as may be required and/or desired in a particular embodiment.

A package repayment plan can comprise at least one beneficiary and at least one of a required payment term. Such a beneficiary can be the plan manager, a customer, the package recipient, a financial institute, an insurance company, a consumer protection agency, the originating shipper, a manufacture, a distributor, a retail store, an e-commerce company, the designated package transport carrier, or other types and kinds of beneficiaries, as may be required and/or desired in a particular embodiment.

In another exemplary embodiment, the package repayment plan can further comprise a plan manager terms and conditions for compliance. Such a plan manager terms and conditions for compliance can include information as to which types and kinds of shipments are covered by the plan, days, times, and methods in which packages can be shipped, a list of designated package transport carriers that can be used for transporting and delivering packages, or other types and kinds of plan manager terms and conditions for compliance, as may be required and/or desired in a particular embodiment.

A required payment term is the agreed payments that will be made to keep the package repayment plan enforce. Such required payment terms can include a recurring subscription fee, a first adjustable fee based, in part, on value of the package, a second adjustable fee based, in part, on metrics of prior stolen packages proximate the destination address, fee paid by a financial institute, fee paid by an insurance company, a transaction fee incurred for authorizing coverage for the destination address and the package, or other types and kinds of required payment terms, as may be required and/or desired in a particular embodiment. In the case of a fee incurred for authorizing coverage, such fee can be a per-package fee, a fee based on the value of the contents of the package, shipment date, shipment method, a plurality of delivery risk metrics, or other criteria, as may be required and/or desired in a particular embodiment.

In an exemplary embodiment, for example and not a limitation, a consumer can visit the PorchBanditProtection.com website, select the package repayment plan they would like, such as receive $100 for a stolen package, provide a destination address to be covered by the package repayment plan, and agree to pay a monthly subscription, such as $10 per month. In this example, the consumer would be the plan manager and could designate themselves as the beneficiary. In operation, in this example, should any number of packages on a given day be stolen from the covered destination address then $100 compensation would be paid to the beneficiary. Subsequent package thefts of different days would each result in compensation of $100 being paid to the beneficiary.

In another exemplary embodiment, for example and not a limitation, a consumer can visit a website, select the package repayment plan they would like, such as receive $75 per package stolen, provide a destination address to be covered by the package repayment plan, and agree to pay a monthly subscription, such as $15 per month. In this example, the consumer would be the plan manager and could designate themselves as the beneficiary. In operation, in this example, should three packages on a given day be stolen from the covered destination address then $225 ($75 times 3 packages) in compensation would be paid to the beneficiary. Subsequent package thefts of different days would each result in compensation of $75 per package theft being paid to the beneficiary.

In another exemplary embodiment, for example and not a limitation, when authorizing, a transaction record can comprise a plan account number, the package value, the shipping date, the shipping method, a destination address, and other relevant information. Such information can be used to authorize the coverage as well as calculate a transaction fee which covers the risk of the package being delivered, left unattended, and subsequently pirated. Once authorization is approved the package is covered by the previously selected package repayment plan. An approved authorization code can be provided to the originating shipper and/or the designated package transport carrier as required in a particular embodiment.

In an exemplary embodiment, for example and not a limitation, a plan manager can select a package repayment plan and receive a plan account number and agree to pay a transaction fee of 5% of the package value for each package authorized for coverage. During operation, a transaction record can be created and data communicated to the present invention. The transaction record comprising the plan account number, destination address, and the value of the package, such as a package value of $125. The package can be authorized for coverage and approved authorization code provided. The transaction fee of $6.25 ($125 package value times the 5% transaction fee) is charged to the plan manager. The method then moves to block 1004.

In block 1004, at least one of the destination address is associated with the package repayment plan. Such destination address can be assigned at the time a plan manager selects a package repayment plan. Alternatively, the destination address can be assigned at the time of shipping. In a plurality of other embodiments, the destination address can be assigned in other ways, as may be required and/or desired in a particular embodiment. The method moves to block 1006.

In block 1006, a plan enforcement period can be established commensurate with receipt of payment in accordance with the required payment term. Such a plan enforcement period is the time period in which, should a package covered by the package repayment plan be delivered, then stolen, and other terms and conditions are met, a restitution payment to the beneficiary would be made in accordance with the package repayment plan. The method then moves to block 1008.

In block 1008, a missing package report is received related to the package which was reportedly delivered, by the designated package transport carrier, then stolen during the plan enforcement period. In an exemplary embodiment, when a package recipient realizes the package has been stolen they would contact the originating shipper. Should the originating shipper decline to refund or ship a replacement product to the recipient, the recipient would contact the designated package transport carrier. The designated package transport carrier would investigate and create a missing package report. Such a missing package report would then be submitted for restitution consideration in the present invention. The method then moves to block 1010.

In block 1010, the beneficiary is compensated in accordance with the package repayment plan when the missing package report was created by the designated package transport carrier, the missing package report indicates the package was delivered to the destination address during the plan enforcement period, the originating shipper and the designated package transport carrier declined to provide a suitable remedy for the package that was stolen.

An advantage in the present invention is the use of a missing package report that was created by the designated package transport carrier. In this regard, these companies typically have excellent resources for investigating missing packages. Such reports can illuminate fraud as well as validate that the package was successfully delivered. In many cases, the investigation by the designated package transport carrier can resolve the matter and reliance on the disposition of such reports to form the basis of the package protection claim limits payments to beneficiaries, in the present invention, to cases when and where appropriate, without having to conduct time consuming and costly inquiries, as the designated package transport carrier have done this work already.

In other exemplary embodiments, additionally, a check to make sure the plan manager is in compliance with the plan manager terms and condition for compliance can be effectuated.

Figure 3:
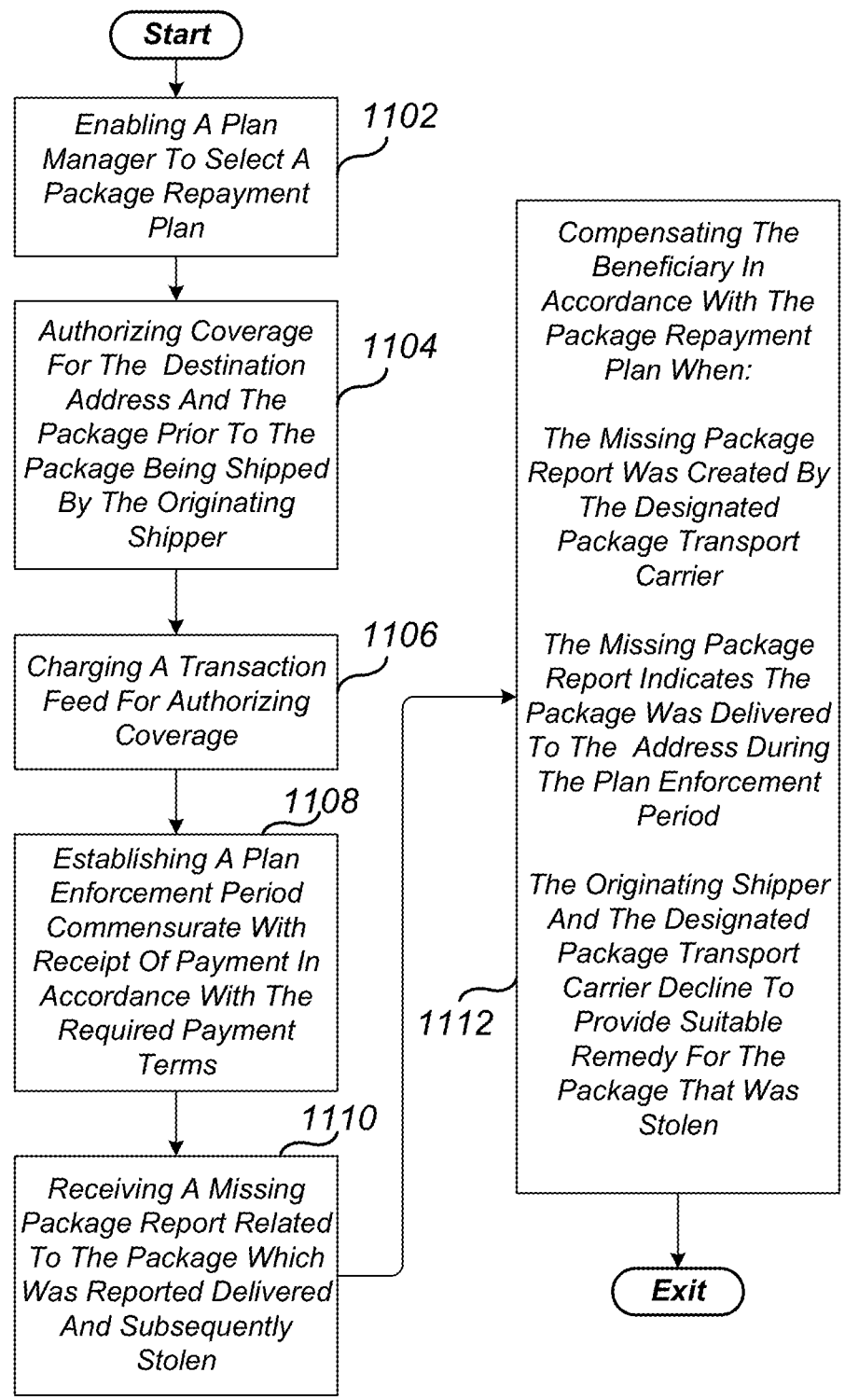

Referring to FIG. 3 there is illustrated one example of a method for providing restitution to at least one of a beneficiary when a package shipped by an originating shipper to at least one of a destination address, by way of a designated package transport carrier, is left unattended and stolen prior to the package recipient taking receipt of the package.

In an exemplary embodiment, a method provides restitution to at least one of a beneficiary when a package shipped by an originating shipper to at least one of a destination address, by way of a designated package transport carrier, is left unattended and stolen from the destination address prior to the package recipient taking receipt of the package. Furthermore, the originating shipper and the designated package transport carrier need to have declined making a suitable remedy for the package that was stolen. The method then begins in block 1002.

In block 1102, a plan manager is enabled to select a package repayment plan, the package repayment plan further comprising at least one of a beneficiary and at least one of a required payment term. The method then moves to block 1104.

In block 1104, coverage for the destination address and value of the package can be authorized prior to the package being shipped by the originating shipper. The method moves to block 1106.

In block 1106, a transaction fee can be charged to the plan manager or other designee for authorizing coverage for the destination address and value of the package. In an exemplary embodiment, the transaction fee can be a fixed fee, a percentage or the value of the package, adjusted for certain pre-determined destination addresses, adjusted for certain time of day or day of week or delivery methods, adjusted based on the plurality of delivery risk metrics, or adjusted in other ways, as may be required and or desired in a particular embodiment.

In operation, in an exemplary embodiment, for example and not a limitation, when authorizing, a transaction record can comprise a plan account number, the package value, the shipping date, the shipping method, a destination address, and other relevant information. Such information can be used to authorize the coverage as well as calculate a transaction fee which covers the risk of the package being delivered, left unattended, and subsequently pirated. Once authorization is approved the package is covered by the previously selected package repayment plan. An approved authorization code can be provided to the originating shipper and/or the designated package transport carrier as required in a particular embodiment. The method moves to block 1108.

In block 1108, a plan enforcement period can be established commensurate with receipt of payment in accordance with the required payment term. Such a plan enforcement period is the time period in which, should a package covered by the package repayment plan be delivered then stolen and other terms and conditions are met, a restitution payment to the beneficiary would be made in accordance with the package repayment plan. The method then moves to block 1110.

In block 1110, a missing package report is received related to the package which was reportedly delivered, by the designated package transport carrier, then stolen during the plan enforcement period. In an exemplary embodiment, when a package recipient realizes the package has been stolen they would contact the originating shipper. Should the originating shipper decline to refund or ship a replacement product to the recipient, the recipient would contact the designated package transport carrier. The designated package transport carrier would investigate and create a missing package report. The method then moves to block 1112.

In block 1112, the beneficiary is compensated in accordance with the package repayment plan when the missing package report was created by the designated package transport carrier, the missing package report indicates the package was delivered to the destination address during the plan enforcement period, and the originating shipper and the designated package transport carrier declined to provide a suitable remedy for the package that was stolen.

Figure 4:
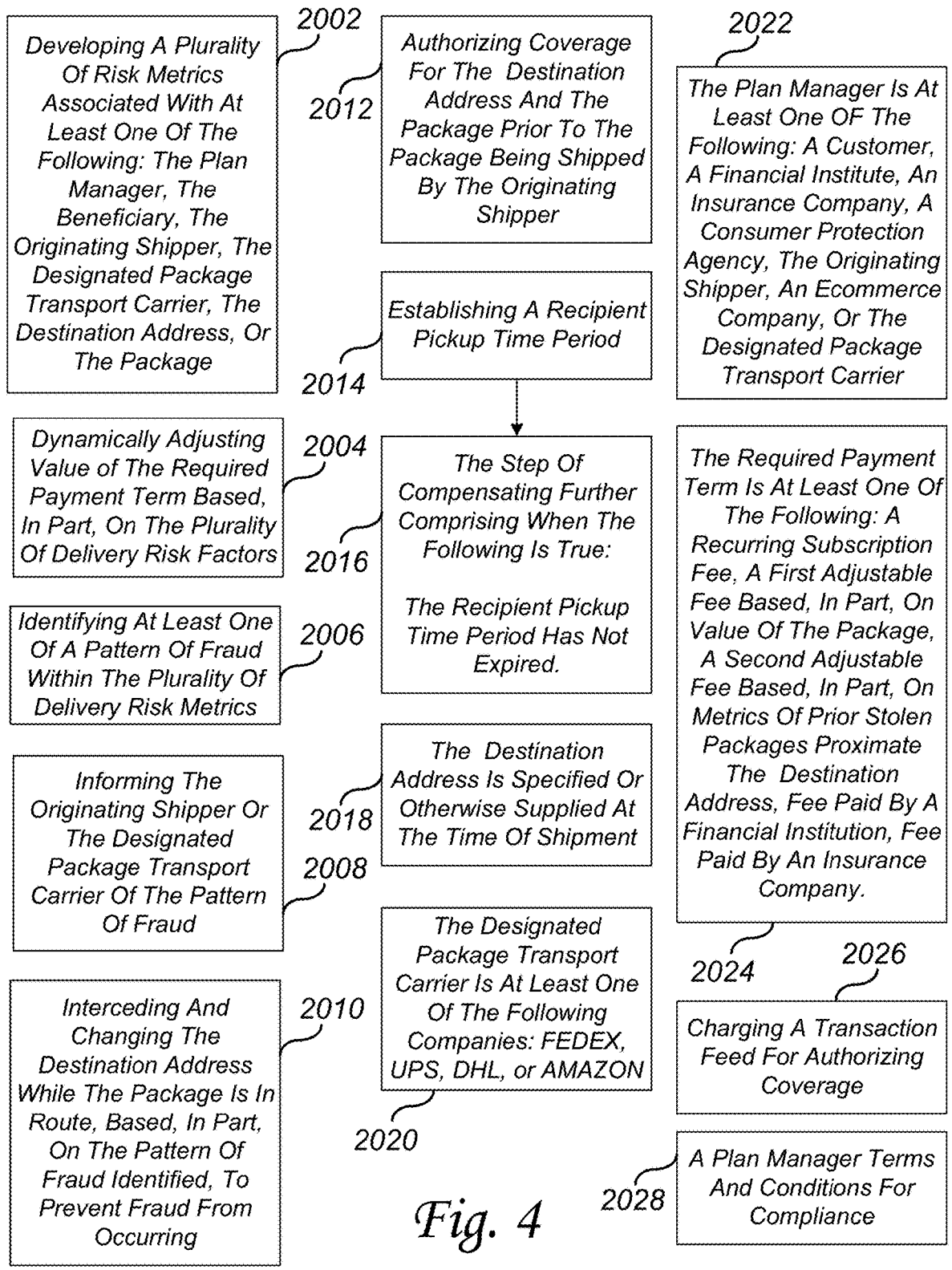
FIGS. 4 and 5 illustrate exemplary embodiments of a method for providing restitution to at least one of a beneficiary when a package shipped by an originating shipper to at least one of a destination address, by way of a designated package transport carrier, is left unattended and stolen prior to the package recipient taking receipt of the package.

Referring to FIG. 4 there is illustrated exemplary embodiments of a method for providing restitution to at least one of a beneficiary when a package shipped by an originating shipper to at least one of a destination address, by way of a designated package transport carrier, is left unattended and stolen prior to the package recipient taking receipt of the package. Such exemplary embodiments can be interchangeably used with the methods of the present invention.

In block 2002, a plurality of delivery risk metrics are developed. The plurality of delivery risk metrics is associated with at least one of the following: the plan manager, the beneficiary, the originating shipper, the designated package transport carrier, the destination address, or the package. In an exemplary embodiment, such metrics can be used to set plan availability and pricing, trigger fraud alerts, and other, as may be required and/or desired in a particular embodiment.

In block 2004, the value of the required payment term is dynamically adjusted based, in part, on the plurality of delivery risk metrics.

In block 2006, at least one of a pattern of fraud is identified within the plurality of delivery risk metrics.

In block 2008, the originating shipper or the designated package transport carrier is informed of the pattern of fraud.

In block 2010, interceding to change the destination address while the package is in-route based, in part, on the pattern of fraud identified, to prevent fraud from occurring.

In block 2012, coverage for the destination address and value of the package can be authorized prior to the package being shipped by the originating shipper. In an exemplary embodiment, such authorization can be on a per-package basis so that each package is assessed for value and delivery risk and a transaction fee to cover the risk is determined appropriately.

In operation, in an exemplary embodiment, for example and not a limitation, when authorizing, a transaction record can comprise a plan account number, the package value, the shipping date, the shipping method, a destination address, and other relevant information. Such information can be used to authorize the coverage as well as calculate a transaction fee which covers the risk of the package being delivered, left unattended, and subsequently pirated. Once authorization is approved the package is covered by the previously selected package repayment plan. An approved authorization code can be provided to the originating shipper and/or the designated package transport carrier as required in a particular embodiment.

In block 2014, a recipient pickup time period can be established. The recipient pickup time period starting when the designated package transport carrier indicates delivery of the package at the destination address. In an exemplary embodiment, the recipient pickup time period is the amount of time allotted for the recipient of the package to secure the delivered package.

In block 2016, the step of compensating further comprises compensating the beneficiary in accordance with the package repayment plan when the recipient pickup time period has not expired.

In block 2018, the destination address is specified at the time of shipment.

In block 2020, the designated package transport carrier is at least one of the following: FEDERAL EXPRESS (FEDEX), UNITED PARCEL SERVICE (UPS), DHL, or AMAZON or AMAZON.COM.

In block 2022, the plan manager is at least one of the following: a customer, a financial institute, an insurance company, a consumer protection agency, the originating shipper, a manufacture, a distributor, a retail store, an e-commerce company, or the designated package transport carrier.

In block 2024, the required payment term is at least one of the following: a recurring subscription fee, a first adjustable fee based, in part, on value of the package, a second adjustable fee based, in part, on metrics of prior stolen packages proximate the destination address, fee paid by a financial institute, fee paid by an insurance company, or a transaction fee incurred for authorizing coverage for the destination address and value of the package prior to the package being shipped by the originating shipper.

In block 2026, charging a transaction fee for authorizing coverage for the destination address and value of the package prior to the package being shipped by the originating shipper. In an exemplary embodiment, the transaction fee can be a fixed fee, a percentage or the value of the package, adjusted for certain pre-determined destination addresses, adjusted for certain time of day or day of week deliveries, adjusted based on the plurality of delivery risk metrics, or adjusted in other ways, as may be required and or desired in a particular embodiment.

In block 2028, in another exemplary embodiment, the package repayment plan can further comprise a plan manager terms and conditions for compliance. Such a plan manager terms and conditions for compliance can include information as to which types and kinds of shipments are covered by the plan, days, times, and methods in which packages can be shipped, a list of designated package transport carriers that can be used for transporting and delivering packages, or other types and kinds of plan manager terms and conditions for compliance, as may be required and/or desired in a particular embodiment.

Figure 5:
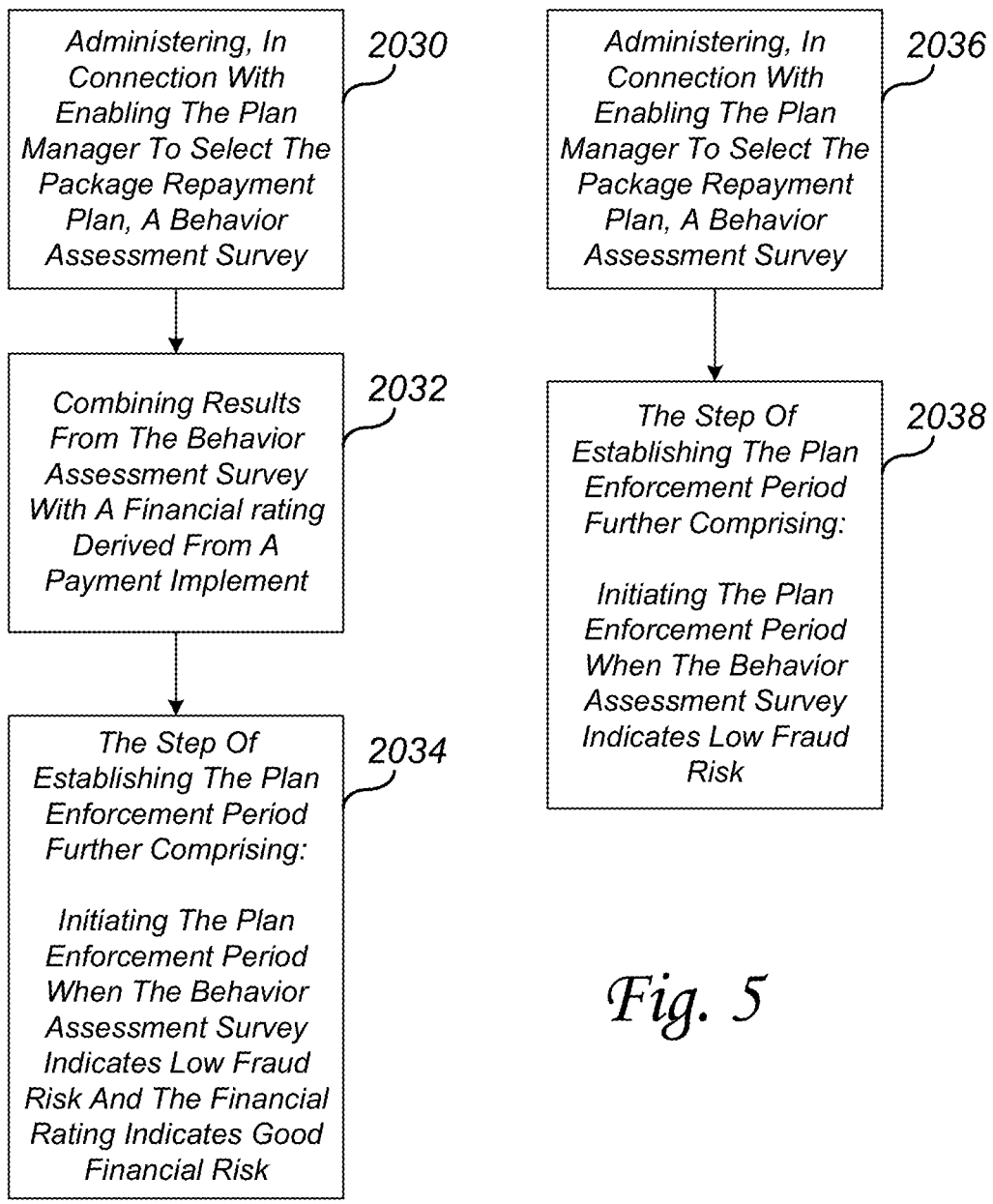

Referring to FIG. 5 there is illustrated exemplary embodiments of a method for providing restitution to at least one of a beneficiary when a package shipped by an originating shipper to at least one of a destination address, by way of a designated package transport carrier, is left unattended and stolen prior to the package recipient taking receipt of the package. Such exemplary embodiments can be interchangeably used with the methods of the present invention.

In block 2030, in connection with enabling the plan manager to select the package repayment plan, a behavior assessment survey is administered, wherein propensity to commit fraud is determined. In an exemplary embodiment, while protecting a plan manager and/or beneficiary from packages stolen from their porch is the objective, such protection must be provided in a manner absent of fraud. To this end, a plan manager and/or beneficiary signing-up for a protection plan only to then stage a package theft and report it to collect package repayment compensation is fraud. To mitigate potential fraud, before it happens, a behavioral assessment survey can be administered to the plan manager, beneficiary, or other, as may be required and/or desired in a particular embodiment. Such behavioral assessment survey can comprise a series of questions that provoke varied responses from the survey taker which inform both quantitatively as well as qualitative aspect of the intention for seeking a package repayment plan. Ideally, the behavioral assessment survey is administered prior to initiating the plan enforcement period; however there may be times when the survey is useful as condition for continuing the plan enforcement period.

In addition, the survey can help the survey taker (i.e. plan manager, beneficiary, or other) in selecting the correct plan for their needs. In this regard, questions related to the types and kinds of packages, destination address, package delivery frequency, and values of the packages typically received at the destination address can help inform which of the package repayment plans best suits the survey taker's needs. Such informing can also include the present invention providing recommendations to the survey taker including suggesting which plan might be right for them, when they should consider receiving packages at alternative addresses, when they shouldn't leave unattended packages at the destination address provided because of risk, when they should consider installing a locker or other lock box to protect delivered packages, and/or other types and kinds of recommendations, as may be require and/or desired in a particular embodiment. The method moves to block 2032.

In an exemplary, for example and not a limitation, a package repayment plan recurring cost might be recommended since the risk of theft at the destination address is higher than normal. The recommendation might follow that, if however, the plan manager were to install a lock box or use as an alternative destination address, such as a place that has a locker where packages can be secured, then a lower cost recurring package repayment may be in order. If the risk of fraud or package theft is too high either before starting a package repayment plan or during the enforcement period and no suitable alternative package repayment plan cost or lock box or locker use is agreeable with the plan manager then the package repayment plan could be terminated.

In block 2032, the results from the behavior assessment survey are combined with a financial rating derived from a payment implement being presented by the plan manager in connection with satisfying the required payment term.

In an exemplary embodiment, the plan manager presents a payment implement such as entering credit card account, expiration, CVS, billing address, or other details into a webpage, providing PAYPAL, VENMO, or other account information, or provide other payment implement details or accounts, as may be required and/or desired in a particular embodiment.

Once the payment details are provide a credit authorization results can be one way of deriving a financial rating. In addition, the number of occurrence of the same payment type is used, the number of accounts opened with the same payment type, and other suspicious activity can all contribute to deriving a financial rating.

Alternatively, a credit checking bureau such as EXPERIAN or credit rating score such as FICO can be used to deriving the financial rating. The method moves to block 2034.

In block 2034, the step of establishing the plan enforcement period further comprising initiating the plan enforcement period when the behavior assessment survey indicates low fraud risk and the financial rating indicates good financial risk. Low metrics or indicators for fraud and good metrics or indicators for financial ratings are desirable to initiating or keeping a plan enforce. Noting the low fraud metrics and good financial metrics are subjective and can be determined or otherwise set bases, in part, on the needs or requirements of a particular embodiment.

In block 2036, similar to block 2030, in connection with enabling the plan manager to select the package repayment plan, a behavior assessment survey is administered, wherein propensity to commit fraud is determined. In an exemplary embodiment, while protecting a plan manager and/or beneficiary from packages stolen from their porch is the objective, such protection must be provided in a manner absent of fraud. The method moves to block 2038.

In block 2038, the step of establishing the plan enforcement period further comprises initiating the plan enforcement period when the behavior assessment survey indicates low fraud risk. Low metrics or indicators for fraud are desirable to initiating or keeping a plan enforce.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for providing monetary restitution to a beneficiary when a package shipped by an originating shipper to a destination address, by way of a designated package transport carrier, is left unattended and stolen from the destination address prior to a package recipient taking receipt of the package and the originating shipper and the designated package transport carrier declined making suitable remedy for the package that was stolen, wherein the package recipient is a user of the method, the method comprising the steps of:

configuring at least one of a data processing resource comprising a server, the server comprising a database for storing a plurality of transaction records, the server further comprising a microprocessor and a memory, the server being configured to communicate data or reports between a computing device associated with the package recipient, a computing device associated with the originating shipper, or a computing device associated with the designated package transport carrier across a global electronic communications network, the memory is encoded with instructions that when executed by the microprocessor perform the steps of:

receiving, by the server, from the package recipient computing device or the originating shipper computing device, selection of predetermined at least one of a package repayment plan associated with a plurality of packages to be shipped to the package recipient from the originating shipper via the designated package transport carrier within a plan enforcement period;

associating with the package repayment plan, by the server, the destination address, the beneficiary, a required payment term, and the plan enforcement period;

authorizing, by the server, coverage under the package repayment plan for the plurality of packages to be shipped to the destination address during the plan enforcement period;

generating, by the server, a transaction record associated with the authorized coverage under the package repayment plan;

generating, by the server, an authorization code and a transaction fee associated with the package repayment plan authorized coverage, wherein the transaction fee is based at least on the required payment term, the transaction fee may be adjusted based on at least one of the value of a package, the destination address, the delivery timing, the delivery method, or based on a plurality of applicable delivery risk metrics;

transmitting, by the server, to the package recipient computing device or the originating shipper computing device the authorization code;

storing, by the server, the transaction record and the authorization code in the database;

receiving, by the server, from the package recipient computing device or the originating shipper computing device, payment of the transaction fee;

establishing, by the server, the plan enforcement period, for the package repayment plan authorized coverage, commensurate with receipt of payment in accordance with the required payment term;

receiving, by the server, a missing package report generated, in part, by the designated package transport carrier computing device related to at least one of the plurality of packages which was reportedly delivered, by the designated package transport carrier, then stolen during the plan enforcement period, wherein the missing package report is based on the originating shipper and the designated package transport carrier declining to compensate the package recipient upon prior request by the package recipient, wherein the missing package report comprises at least (i) the destination address, (ii) the authorization code, and (iii) an indication that the package was delivered to the destination address during the plan enforcement period;

associating, by the server, in the database, the missing package report and the authorization code with the transaction record for the package repayment plan; and compensating, by the server, the beneficiary in accordance with the package repayment plan authorized coverage.

2. The method in accordance with claim 1, further comprising the step of:

administering, in connection with selecting the package repayment plan, a behavior assessment survey, wherein propensity to commit fraud is determined; and the step of authorizing, by the server, coverage under the package repayment plan further comprising:

denying authorization of the package repayment plan when the behavior assessment survey indicates fraud risk.

3. The method in accordance with claim 1, further comprising the step of:

developing a plurality of delivery risk metrics associated with at least one of the following: a plan manager, the beneficiary, the originating shipper, the designated package transport carrier, the destination address, or one or more of the plurality of packages.

4. The method in accordance with claim 3, further comprising the step of:

adjusting, dynamically, value of the required payment term based, in part, on the plurality of delivery risk metrics.

5. The method in accordance with claim 3, further comprising the step of:

identifying at least one of a pattern of fraud within the plurality of delivery risk metrics.

6. The method in accordance with claim 5, further comprising the step of:

informing the originating shipper or the designated package transport carrier of the pattern of fraud.

7. The method in accordance with claim 5, further comprising the step of:

interceding and changing the destination address while one or more of the plurality of packages is in-route based, in part, on the pattern of fraud identified, to prevent fraud from occurring.

8. The method in accordance with claim 1, further comprising the step of:

determining a financial rating derived from a payment implement presented in connection with satisfying the required payment term; and the step of authorizing, by the server, coverage under the package repayment plan further comprising:

denying authorization of the package repayment plan when the financial rating indicates financial risk.

9. The method in accordance with claim 1, further comprising the steps of:

establishing a recipient pickup time period, wherein the recipient pickup time period starts when the designated package transport carrier indicates delivery of one or more of the plurality of packages at the destination address; and the step of compensating further comprising:
compensating the beneficiary in accordance with the package repayment plan when the following is true: the recipient pickup time period has not expired.

10. A system for providing monetary restitution to a beneficiary when a package shipped by an originating shipper to a destination address, by way of a designated package transport carrier, is left unattended and stolen from the destination address prior to a package recipient taking receipt of the package and the originating shipper and the designated package transport carrier declined making suitable remedy for the package that was stolen, wherein the package recipient is a user of the system, the system comprising:

configuring at least one of a data processing resource comprising a server, the server comprising a database for storing a plurality of transaction records, the server further comprising a microprocessor and a memory, the server being configured to communicate data or reports between a computing device associated with the package recipient, a computing device associated with the originating shipper, or a computing device associated with the designated package transport carrier across a global electronic communications network, the memory is encoded with instructions that when executed by the microprocessor perform the steps of:

receiving, by the server, from the package recipient computing device or the originating shipper computing device, selection of predetermined at least one of a package repayment plan associated with a plurality of packages to be shipped to the package recipient from the originating shipper via the designated package transport carrier within a plan enforcement period;

associating with the package repayment plan, by the server, the destination address, the beneficiary, a required payment term, and the plan enforcement period;

authorizing, by the server, coverage under the package repayment plan for the plurality of packages to be shipped to the destination address during the plan enforcement period;

generating, by the server, a transaction record associated with the authorized coverage under the package repayment plan;

generating, by the server, an authorization code and a transaction fee associated with the package repayment plan authorized coverage, wherein the transaction fee is based at least on the required payment term, the transaction fee may be adjusted based on at least one of the value of a package, the destination address, the delivery timing, the delivery method, or based on a plurality of applicable delivery risk metrics;

transmitting, by the server, to the package recipient computing device or the originating shipper computing device the authorization code;

storing, by the server, the transaction record and the authorization code in the database;

receiving, by the server, from the package recipient computing device or the originating shipper computing device, payment of the transaction fee;

establishing, by the server, the plan enforcement period, for the package repayment plan authorized coverage, commensurate with receipt of payment in accordance with the required payment term;

receiving, by the server, a missing package report generated, in part, by the designated package transport carrier computing device related to at least one of the plurality of packages which was reportedly delivered, by the designated package transport carrier, then stolen during the plan enforcement period, wherein the missing package report is based on the originating shipper and the designated package transport carrier declining to compensate the package recipient upon prior request by the package recipient, wherein the missing package report comprises at least (i) the destination address, (ii) the authorization code, and (iii) an indication that the package was delivered to the destination address during the plan enforcement period;

associating, by the server, in the database, the missing package report and the authorization code with the transaction record for the package repayment plan; and compensating, by the server, the beneficiary in accordance with the package repayment plan authorized coverage.

11. The system in accordance with claim 10, further comprising the steps of:
administering, in connection with selecting the package repayment plan, a behavior assessment survey, wherein propensity to commit fraud is determined;
combining results from the behavior assessment survey with a financial rating derived from a payment implement presented in connection with satisfying the required payment term; and
the step of authorizing, by the server, coverage under the package repayment plan further comprising:
denying authorization of the package repayment plan when the behavior assessment survey indicates fraud risk or the financial rating indicates financial risk.

12. The system in accordance with claim 10, further comprising the step of:
developing a plurality of delivery risk metrics associated with at least one of the following: a plan manager, the beneficiary, the originating shipper, the designated package transport carrier, the destination address, or one or more of the plurality of packages.

13. The system in accordance with claim 12, further comprising the step of:
adjusting, dynamically, value of the required payment term based, in part, on the plurality of delivery risk metrics.

14. The system in accordance with claim 12, further comprising the step of:
identifying at least one of a pattern of fraud within the plurality of delivery risk metrics.

15. The system in accordance with claim 14, further comprising the step of:
informing the originating shipper or the designated package transport carrier of the pattern of fraud.

16. The system in accordance with claim 14, further comprising the step of:
interceding and changing the destination address while one or more of the plurality of packages is in-route based, in part, on the pattern of fraud identified, to prevent fraud from occurring.

17. The system in accordance with claim 10, further comprising the step of:

establishing a recipient pickup time period, wherein the recipient pickup time period starts when the designated package transport carrier indicates delivery of one or more of the plurality of packages at the destination address; and the step of compensating further comprising:

compensating the beneficiary in accordance with the package repayment plan when the following is true: the recipient pickup time period has not expired.

18. A method for providing monetary restitution to a beneficiary when a package shipped by an originating shipper to a destination address, by way of a designated package transport carrier, is left unattended and stolen from the destination address prior to a package recipient taking receipt of the package and the originating shipper and the designated package transport carrier declined making suitable remedy for the package that was stolen, wherein the package recipient is a user of the method, the method comprising the steps of:

configuring at least one of a data processing resource comprising a server, the server comprising a database for storing a plurality of transaction records associated with a plurality of shipped packages, the server further comprising a microprocessor and a memory, the server being configured to data communicate with a computing device associated with the package recipient, a computing device associated with the originating shipper, or a computing device associated with the designated package transport carrier across a global electronic communications network, the memory is encoded with instructions that when executed by the microprocessor perform the steps of:

receiving, by the server, from the package recipient computing device or the originating shipper computing device, selection of predetermined at least one of a package repayment plan associated with a package to be shipped to the package recipient from the originating shipper via the designated package transport carrier;

associating with the package repayment plan, by the server, the destination address, the beneficiary, a required payment term, and the plan enforcement period;

authorizing, by the server, coverage under the package repayment plan for the package on a per-package basis for the destination address;

generating, by the server, a transaction record associated with the authorized coverage under the package repayment plan;

generating, by the server, an authorization code and a transaction fee associated with the package repayment plan authorized coverage, wherein the transaction fee is based on at least one of the value of the package, the destination address, the delivery timing, or the delivery method, wherein the transaction fee may be adjusted based on a plurality of applicable delivery risk metrics;

transmitting, by the server, to the originating shipper computing device or the designated package transport carrier computing device the authorization code;

storing, by the server, the transaction record and the authorization code in the database;

receiving, by the server, from the package recipient computing device or the originating shipper computing device, payment of the transaction fee;

establishing, by the server, a plan enforcement period, for the package repayment plan authorized coverage, commensurate with receipt of payment in accordance with the required payment term;

receiving, by the server, a missing package report generated, in part, by the designated package transport carrier computing device, related to the package which was reportedly delivered, by the designated package transport carrier, then stolen during the plan enforcement period, wherein the missing package report is based on the originating shipper and the designated package transport carrier declining to compensate the package recipient upon prior request by the package recipient, wherein the missing package report comprises at least (i) the destination address, (ii) the authorization code, and (iii) an indication that the package was delivered to the destination address during the plan enforcement period;

associating, by the server, in the database, the missing package report and the authorization code with the transaction record for that package;

compensating, by the server, the beneficiary in accordance with the package repayment plan authorized coverage.

19. The method in accordance with claim 18, further comprising the steps of:

administering, in connection with selecting the package repayment plan, a behavior assessment survey, wherein propensity to commit fraud is determined;

combining results from the behavior assessment survey with a financial rating derived from a payment implement presented in connection with satisfying the required payment term; and the step of authorizing, by the server, coverage under the package repayment plan further comprising:

denying authorization of the package repayment plan when the behavior assessment survey indicates fraud risk or the financial rating indicates financial risk.

20. The method in accordance with claim 18, further comprising the step of:

interceding and changing the destination address while one or more of the plurality of packages is in-route based, in part, on when a pattern of fraud is identified, to prevent fraud from occurring.

* * * * *